Oct. 16, 1934.  F. H. McCORMICK  1,977,394
TEMPERATURE CONTROL DEVICE
Original Filed Nov. 17, 1931
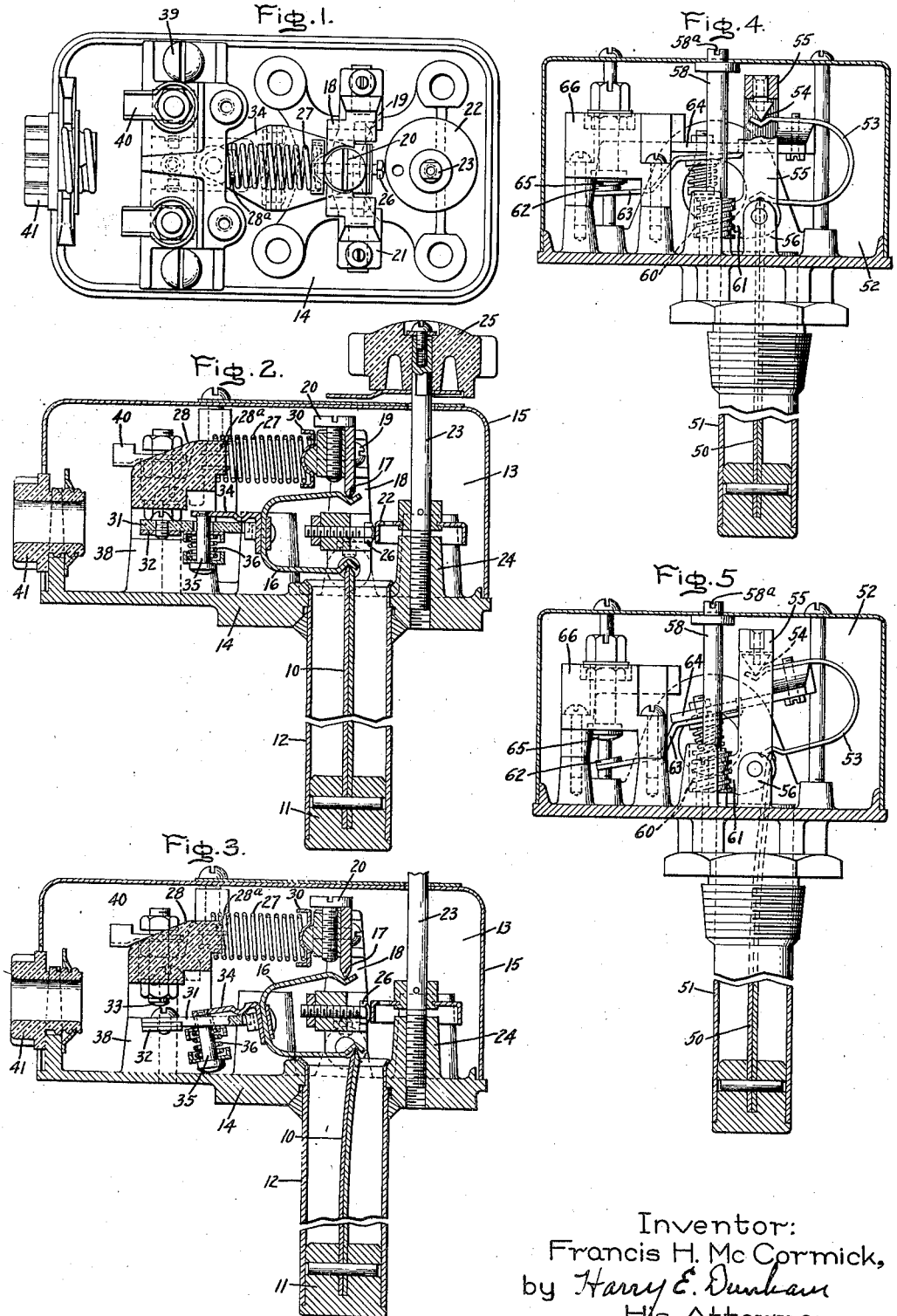
Inventor:
Francis H. McCormick,
by Harry E. Dunham
His Attorney.

Patented Oct. 16, 1934

1,977,394

UNITED STATES PATENT OFFICE

1,977,394

TEMPERATURE CONTROL DEVICE

Francis H. McCormick, Glen Ellyn, Ill., assignor to General Electric Company, a corporation of New York Original application November 17, 1931, Serial No. 575,593. Divided and this application May 12, 1934, Serial No. 725,338

11 Claims. (Cl. 200—139)

My invention relates to temperature control devices, more particularly to devices for controlling an electric circuit in accordance with temperature changes, and it has for its object the provision of an improved device of this character.

In general, my invention relates to temperature responsive devices, such as described and claimed in United States reissue patent to A. Lewerenz, No. 16,654, dated June 14, 1927, and more specifically relates to improvements in the temperature control device described and claimed in the United States patent to A. H. Simmons, No. 1,743,073, dated January 7, 1930. The temperature control devices disclosed in these patents comprise a bimetallic thermostat bar fixed at one end and having its other end free to move in response to changes in temperature. These movements of the bimetallic bar are utilized to control a switch arm or other suitable control member. Bearing on the movable end of the bimetallic bar is an elastic member arranged to cause the bar to move quickly from one position to another and thereby give the switch a snap action in opening and closing the circuit which it controls.

My invention contemplates the provision of improved means for adjusting the temperature setting of the temperature responsive device.

In carrying out my invention in one form thereof, I provide a bimetallic thermostat bar having one of its ends fixed and its other end movable laterally in response to changes in temperature. An elastic member is arranged to apply a force to the movable end of the bar so as to cause the bar to move quickly from one position to another. In order to adjust the temperature setting of the control device in accordance with this invention, suitable means are provided for changing the position of the elastic member bearing on the movable end of the bimetallic thermostat bar.

This invention is a division of my copending application, Serial No. 575,593, filed November 17, 1931.

For a more complete understanding of this invention, reference should be had to the accompanying drawing, in which Fig. 1 is a plan view of a temperature control device embodying my invention; Fig. 2 is a vertical central sectional view of the temperature control device of Fig. 1, portions being broken away; Fig. 3 is a view similar to Fig. 2, but illustrating certain elements of the control device in different operative positions than they occupy in Fig. 2; Fig. 4 is an elevation partly in section illustrating a modified form of my invention, parts being broken away; and Fig. 5 is a view similar to Fig. 4, but illustrating certain elements of the device in different operative positions than they occupy in Fig. 4.

Referring to the drawing, I have shown my invention in one form as applied to a temperature responsive device intended to be used to control a rather large current, such as those encountered in hot water heating systems, but it is to be understood that my invention is not limited thereto. Referring more particularly to Figs. 1, 2, and 3, a bimetallic temperature responsive bar 10 is secured at one end to a supporting block 11 rigidly secured in the lower end, as viewed in Figs. 2 and 3, of a tubular receptacle 12. This receptacle, it will be understood is arranged to be inserted through a suitable aperture provided for it in a hot water tank or other like member so that the tube will be immersed in the liquid being heated.

The upper end of the bimetallic bar emerges from the mouth of the tubular receptacle 12 and extends into a suitable receptacle 13. This receptacle is defined by a base member 14 which is secured to the upper end of the tube 12 and a casing 15 cooperating with the base to define the chamber 13.

The upper end of the bimetallic bar is provided with a knife-edge bearing fitted into a seat provided for it in one arm of a U-shaped spring member 16, the other arm of which is provided with a bearing seat receiving a stationary knife-edge bearing 17. The knife-edge bearing 17, as shown, is secured to a yoke-member 18, suitable seats being provided in the yoke-member for receiving the knife-edge bearing. Screws 19 are provided on opposite sides of the bearing 17 for securing it to the yoke. A screw 20 is provided for adjusting the tension of the U-shaped spring member 16.

The yoke member 18 is pivotally mounted in suitable bearings 21 provided for it on the base 14. These bearings, as shown, are disposed on opposite sides of the mouth of the tube 12 and preferably will be so arranged that the yoke will swing on an axis substantially parallel with the bearing faces of the knife-edges of the bimetallic bearing and the bearing 17. As shown in Fig. 2, the axis of rotation of the yoke 18 is substantially coincident with the bearing axis of the movable end of the bimetallic bar 10, when the bar 10 is in its position shown in this figure.

Suitable means are provided for adjusting the position of the yoke member so as to adjust the position of the pivot 17 and hence the position of the spring member 16 relative to the bimetallic bar. This adjusting means comprises a suitable cam-like member 22 arranged on an adjusting screw or shaft 23.

As shown, the lower end of this shaft is threaded into a boss 24 provided for it on the base 14. From this boss the shaft extends vertically and passes through an aperture provided for it in the casing 15 to the exterior of the casing where an operating knob 25 is secured to the shaft.

The cam member 22 is arranged to bear against a suitable adjustable screw abutment 26 threaded into and supported by the yoke 18. The yoke 18 is biased toward the right, as viewed in Figs. 2 and 3, so as to cause the abutment 26 to bear against the cam 22. For this purpose I have provided a suitable compression spring 27 having one end bearing against the upper end of the yoke 18 and its opposite end bearing against a fixed abutment or support 28. As shown, the member 28 is provided with a projecting portion 28a arranged to be inserted in this latter end of the spring 27, whereas the yoke 18 is provided with a cup-like retaining member 30 surrounding its end of the spring. It will be observed that by reason of the foregoing arrangement, the position of the yoke can be adjusted merely by turning the knob 25.

Mounted on the U-shaped spring member 16 is a suitable switch arm 31 carrying a bridging contact 32 arranged to cooperate with suitable fixed contacts 33 carried by the supporting member 28. The switch arm 31 is formed from some suitable electrically insulating material, such as a phenol condensation product. The bridging contact 32 is arranged for relative movement with respect to its supporting U-shaped spring member 16. For this purpose, the member 31 is connected to the U-shaped spring 13 through the medium of an arm 34 rigidly secured to the central portion or base of the spring member, as shown more clearly in Figs. 2 and 3. A suitable spring connection is interposed between the arms 31 and 34. This connection, as shown, comprises a stud-like member 35 having one end passed through an aperture provided for it in the spring arm 31 and rigidly secured to the arm 34. Interposed between the head of this stud and the switch arm 31 is a suitable compression spring 36.

As pointed out in detail in the above-mentioned Simmons patent, the function of the U-shaped spring member 16 is to cause the bimetallic bar to move or snap quickly between its controlling positions. The U-shaped spring member functions to retard the initial movement of the bimetallic bar to a neutral position and to accelerate the bar after the bar has moved through its neutral position.

The switch is so arranged that when it is in its closed position, shown in Fig. 2, the bimetallic bar 10 will be allowed to move somewhat in its switch opening direction before the contact arm 31 is actuated to disengage the bridging and fixed contacts. Thus, the initial slow motion of the thermostat is absorbed and the thermostat is allowed to accelerate to a considerable speed before the switch contacts will be opened.

The supporting member 28 is formed of some suitable electrically insulating material, such as a molded phenol condensation product, and, as shown, is supported on bosses 38 provided for it on the base 14. Screw fastening means 39 are provided to secure the member 28 to its base. The fixed contacts 33 extend through this supporting member 28 and on their upper ends are provided with suitable clips 40 which may be connected in the circuit which is to be controlled or in a controlling circuit for the circuit which is to be controlled. The casing is provided with a suitable bushing 41 through which the conductors of the controlled circuit are passed for connection with the terminal clips 40.

In the operation of the temperature control device shown in Figs. 1, 2, and 3, it will be understood that the switch will be held in its closed position, as shown in Fig. 2, as long as the temperature of the device, whose temperature is being controlled, is below the predetermined maximum temperature for which the device is set. Under these conditions, the movable end of the thermostat is situated below its neutral position. As the temperature increases, the distortion of the thermostat tends to move its free end upwardly. This motion is resisted by the operation of the resilient member 16 until the occurrence of a predetermined maximum temperature, whereupon the thermostat has sufficient force to overcome the spring and it starts to move rapidly toward its switch opening position. As the thermostat moves upwardly, the spring 16 decreasingly resists its motion, with the result that the thermostat rapidly accelerates and moves at a high speed through its neutral position to the opposite side thereof, where it is urged rapidly to its switch opening position by the increasing lateral component of the force applied by the spring 16. The switch is thus quickly opened, the bridging contact 32 being thrown open with a snap action to its position shown in Fig. 3. This snap action is further assured by the flexible connection between the switch operating arm 31 and the U-shaped spring 16. Thus, it will be observed that the initial slow retarded motion of the bimetallic bar 10 is absorbed by the loose connection between the switch arm 31 and the spring 16 before the arm is engaged by the portion 34 to open the switch.

After the heating circuit has been opened, the temperature of the controlled device and consequently the temperature of the thermostat begins to decrease, and the thermostat tends to move back to its closed circuit position. Its movement in this direction is opposed by the force exerted by the spring member 16, this force being overcome at a predetermined minimum temperature at which the thermostat will snap to close the switch.

In order to adjust the temperature setting of the control device to maintain various predetermined temperatures, the stationary pivot 17 is moved to change the position of the spring 16 relative to the bimetallic bar. It will be observed that when the knob 25 is rotated, the position of the yoke 18 and hence the position of the fixed knife-edge bearing 17 is changed. This obviously changes the position of the neutral line which passes between the fixed knife edge bearing 17 and the point of support of the fixed end of the bimetallic bar 10. It will be obvious that by changing the position of this neutral line, the temperature at which the thermostat will snap from one position to the other likewise will be changed. To set the device to maintain a higher temperature, the knob 25 will be turned so as to allow the yoke 18 to move in a clockwise direction, as viewed in Figs. 2 and 3. Adjustment of the yoke in the opposite direction will decrease the temperature that will be maintained. An adjustment of the knife edge bearing 17 to vary the tension of the U-shaped spring 16 by moving the bearing 17 transversely of the yoke by adjusting the screw 20 changes the range between the maximum and minimum temperatures at which the circuit is opened and closed by the device.

The modified form of my invention shown in Figs. 4 and 5 has substantially the same structure and operation as has the form shown in Figs. 1, 2, and 3 with the exception of the means provided for moving the yoke which supports the fixed knife-edge bearing for the U-shaped spring member and with the exception of slight changes in the means for supporting the switch actuating arm.

As shown in Figs. 4 and 5, the bimetallic bar 50 in this form is secured at its lower end in a suitable tubular member 51 that projects from the tube into a suitable casing 52. The projecting end bears on one arm of a U-shaped spring member 53. The other arm of this spring member as shown, bears on a fixed knife-edge bearing 54 carried by a yoke member 55. This yoke member, as shown, is pivotally mounted in suitable bearings 56 provided on the base of the casing. The yoke is adjusted by means of screw means comprising a shaft 58 vertically supported on the base of the casing and provided at its lower end with a worm 60. This worm meshes with an arcuate shaped rack 61 provided on one arm of the yoke 55. This rod projects from the casing 52 and is provided with a slot 58a for the reception of a screw-driver or similar instrument whereby adjustment from the exterior of the casing may be conveniently effected. It will be obvious that by turning this screw in one direction or the other, the position of the yoke 55 and hence the position of the knife-edge bearing 54 will be changed. This adjustment, as has been explained in the discussion of the form shown in Figs. 1, 2, and 3, changes the position of the U-shaped spring 53 relative to the bimetallic bar 50 and hence changes the temperature setting of the thermostat. It will be understood that the screw connections between the member 58 and the yoke 55 serves to support the yoke in its adjusted position.

The bridging contact 62 in this case is carried by an arm 63 which is flexibly connected with an actuating arm 64 in substantially the same manner as are the arms 31 and 34 of the device shown in Figs. 1, 2, and 3 connected together. The arm 64 in this case, however, is not connected to the mid-portion of the actuating U-shaped spring member, as is the arm 34 of Figs. 1, 2, and 3, but is connected to the inner side of one of the legs of this member; as shown, this arm is connected to the inner side of the leg bearing on the fixed pivot 54. The bridging contact 62 cooperates with fixed contacts 65 which are secured to an electrically insulating supporting member 66 which in turn is supported on the base of the casing 52. It will be understood that these fixed contacts will be connected in the circuit to be controlled or the controlling circuit for the circuit to be controlled.

The operation of this form of my invention is substantially the same as is the operation of the form shown in Figs. 1, 2, and 3 and it is believed to be unnecessary to describe in detail the operation here.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A temperature control device comprising a thermostat, an elastic member arranged to cause said thermostat to move quickly from one position to another, and means controlling the position of said elastic member in the plane of movement of said thermostat to adjust the temperature setting of said control device so as to maintain a selected predetermined temperature.

2. A temperature control device comprising a bimetallic thermostat bar having one end fixed and its other end free to move in response to temperature changes, a spring bearing on said movable end and movable with said bar in the plane of movement thereof so as to resist the initial movement of said bar from one position to another and thereafter quickly move said bar to said other position, a support for said spring and means for varying the position of said support in the plane of movement of said bar so that the temperature setting of said thermostat is adjusted to maintain a selected predetermined temperature within a predetermined temperature range.

3. A temperature control device comprising a thermostat, an elastic member bearing on said thermostat and movable with said bar in the plane of movement thereof so as to cause said thermostat to move quickly from one position to another, a bearing for said elastic member, and means for adjusting the position of said bearing in the plane of movement of said thermostat so as to adjust the temperature setting of said thermostat.

4. A temperature control device comprising a thermostat bar having one end fixed and its other end free to move in response to changes in temperature, an elastic member having one end bearing on the movable end of said bar and movable with said bar in the plane of movement thereof so as to cause said bar to move quickly from one position to another, a movable support for the other end of said elastic member, elastic means biasing said support in one direction, a stop member for said support and means for changing the position of said stop member to adjust the setting of said thermostat.

5. A temperature control device comprising a bimetallic thermostat bar having one end free to move in response to temperature changes, a yoke, a spring interposed between said yoke and said free end and exerting a force on said free end tending to retard the initial movement of said bar from one position to another and thereafter to quickly move said bar to said other position, means pivotally supporting said yoke whereby the latter can be moved to adjust the position of said spring with respect to said thermostat bar, a spring bearing on said yoke and tending to move it in one direction on its pivotal supporting means, a stop opposing the movement of said yoke in said one direction and means for adjusting the position of said stop to vary the position of said yoke.

6. A temperature control device comprising a thermostat, a pivot, a U-shaped spring member having one arm bearing on said pivot and its other arm bearing on said thermostat and movable with said thermostat in its plane of movement so as to cause said thermostat to move quickly from one position to another, resilient means tending to move said pivot in one direction in said plane of movement of said thermostat to change the temperature setting of said thermostat, a stop member for said pivot and means for changing the position of said stop whereby the setting of said thermostat is varied to maintain a selected predetermined temperature.

7. A temperature control device comprising a thermostat bar having one end fixed and its other end free to move in response to changes in temperature, an elastic member having one end bearing on the movable end of said bar and movable with said bar in its plane of movement so as to cause said thermostat to move quickly from one position to another, a support for the other end of said elastic member movable in the plane of movement of said thermostat and screw means arranged to adjust the position of said support in said plane of movement so as to adjust the temperature setting of said device to maintain a preselected temperature.

8. A temperature control device comprising a thermostat bar having one end fixed and its other end movable in response to changes in temperature, a spring bearing on the movable end of said bar and arranged to cause said bar to move quickly from one position to another, a support for said spring, means pivotally mounting said support on an axis substantially perpendicular to the plane of movement of said bar and means for varying the position of said support on said axis to adjust the temperature setting of said device.

9. A temperature control device comprising a thermostat bar having one end fixed and its other end movable in response to changes in temperature, a spring bearing on the movable end of said thermostat for pivotal movement about a bearing axis defined by said movable end, a support for said spring, and means pivotally mounting said support for movement about an axis coincident with said bearing axis in one of its positions, and means for moving said support on its pivot to adjust the temperature setting of said device.

10. A temperature control device comprising a thermostat, an elastic member movable with said thermostat in its plane of movement so as to cause said thermostat to move quickly from one position to another, means controlling the position of said elastic member in said plane of movement to adjust the temperature setting of said control device so as to maintain a predetermined temperature and means controlling the tension in said elastic member to change the temperature range of said device.

11. A temperature control device comprising a thermostat bar having one end fixed and its other end movable in response to changes in temperature, a spring bearing on the movable end of said thermostat for pivotal movement about a bearing axis defined by said movable end, a support for said spring, and means pivotally mounting said support for movement about an axis coincident with said bearing axis in one of its positions, means for moving said support on its pivot to adjust the temperature setting of said device, and means controlling the tension in said spring.

FRANCIS H. McCORMICK.